(12) United States Patent
Sumner et al.

(10) Patent No.: US 9,090,329 B2
(45) Date of Patent: Jul. 28, 2015

(54) LOW PROFILE JETTISONABLE DOOR SYSTEM

(71) Applicant: Bell Helicopter Textron Inc., Fort Worth, TX (US)

(72) Inventors: William P. Sumner, Kingsport, TN (US); Philip J. Bookout, Johnson City, TN (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 269 days.

(21) Appl. No.: 13/746,015

(22) Filed: Jan. 21, 2013

(65) Prior Publication Data

US 2013/0200214 A1 Aug. 8, 2013

Related U.S. Application Data

(60) Provisional application No. 61/596,089, filed on Feb. 7, 2012.

(51) Int. Cl.
*B64C 1/14* (2006.01)
*B64C 1/32* (2006.01)
*B64C 27/04* (2006.01)

(52) U.S. Cl.
CPC ............... *B64C 1/1407* (2013.01); *B64C 1/32* (2013.01); *B64C 27/04* (2013.01)

(58) Field of Classification Search
CPC .... B64C 1/1407; B64C 1/1423; B64C 1/143; B64C 1/32
USPC .............. 244/129.4, 129.5; 16/229, 230, 231, 16/232, 260, 261, 262, 263, 270; 49/141
See application file for complete search history.

(56) References Cited

U.S. PATENT DOCUMENTS

| 3,851,845 | A | | 12/1974 | Edwards |
| 4,102,011 | A | | 7/1978 | Clack, Jr. |
| 5,826,824 | A | * | 10/1998 | Martin et al. ............... 244/129.3 |
| 6,427,383 | B1 | * | 8/2002 | Brooks et al. ................... 49/141 |
| 2007/0245522 | A1 | | 10/2007 | Selvaraj |
| 2010/0264696 | A1 | * | 10/2010 | Tuhy ........................ 296/190.11 |

FOREIGN PATENT DOCUMENTS

EP 2441667 A1 4/2012

OTHER PUBLICATIONS

European Search Report in related European Application No. 13153927.2, dated Sep. 9, 2013, 7 pages.
Canadian Office Action in related Canadian Application No. 2,803,396, dated Feb. 25, 2014, 3 pages.

(Continued)

*Primary Examiner* — Nicholas McFall
(74) *Attorney, Agent, or Firm* — Noah A. Trevis

(57) ABSTRACT

A jettisonable door system for an aircraft includes an upper hinge having a forward portion that is hingedly coupled to an airframe of the aircraft, the upper hinge having an aft portion that is releasably secured to an upper outboard plate with an upper pin. The jettisonable door system further includes a lower hinge having a forward portion that is hingedly coupled to the airframe of the aircraft, the upper hinge having an aft portion that is releasably secured to a lower outboard plate with a lower pin. A rotation of the upper pin releases the upper hinge from the upper outboard plate and a rotation of the lower pin releases the lower hinge from the lower outboard plate.

17 Claims, 8 Drawing Sheets

(56) References Cited

OTHER PUBLICATIONS

Office Action in Canadian Application No. 2,803,396, dated Jan. 16, 2015, 3 pages.

European Notice of Allowance in related European Application No. 13153927.2, dated Nov. 20, 2014, 27 pages.

European Decision to Grant in related European Application No. 13153927.2, dated Jan. 9, 2015, 2 pages.

* cited by examiner

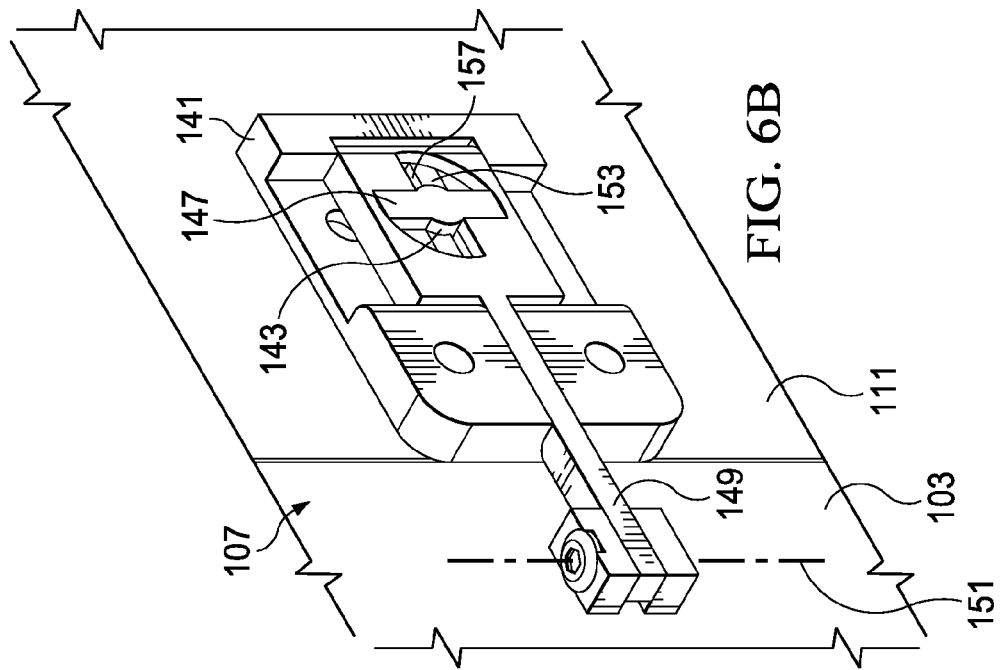
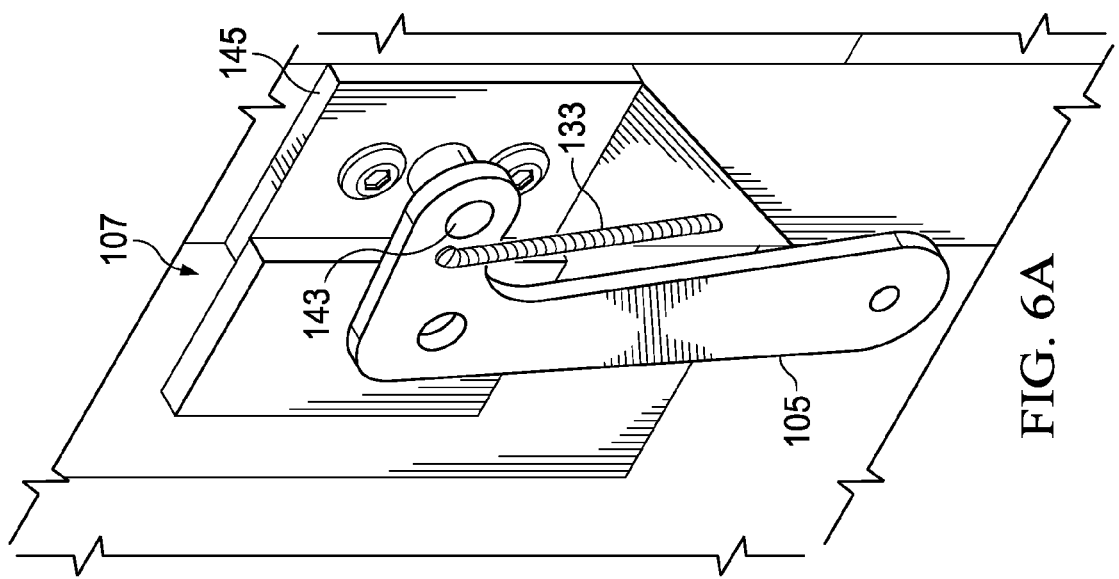

LOW PROFILE JETTISONABLE DOOR SYSTEM

BACKGROUND

1. Technical Field

The present disclosure relates to a jettisonable door system for an aircraft. More specifically, the present disclosure relates to a jettisonable door release mechanism for a rotorcraft.

2. Description of Related Art

It can be desirable for a pilot to quickly and efficiently egress an aircraft in an emergency situation. For example, during a controlled ditch of an aircraft over a body of water, it is desirable for the pilot to efficiently remove the door from the airframe so the pilot can timely egress the aircraft.

There is a need for an efficient jettisonable door system for a rotorcraft.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6A is a partial interior perspective view of the upper hinge assembly of the jettisonable door system, according to an illustrative embodiment of the present disclosure;

FIG. 6B is a partial exterior perspective view of the upper hinge assembly of the jettisonable door system, according to an illustrative embodiment of the present disclosure;

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the present disclosure include an efficient, compact, and aesthetic jettisonable door system. The present disclosure further includes a method of egressing a rotorcraft. One unique feature of the system of the present application is the use of a quarter-turn, cam-like action to secure/release the hinges of the door. The system is configured so that the entire door is removed from the airframe during an emergency egress event.

Figure 10:
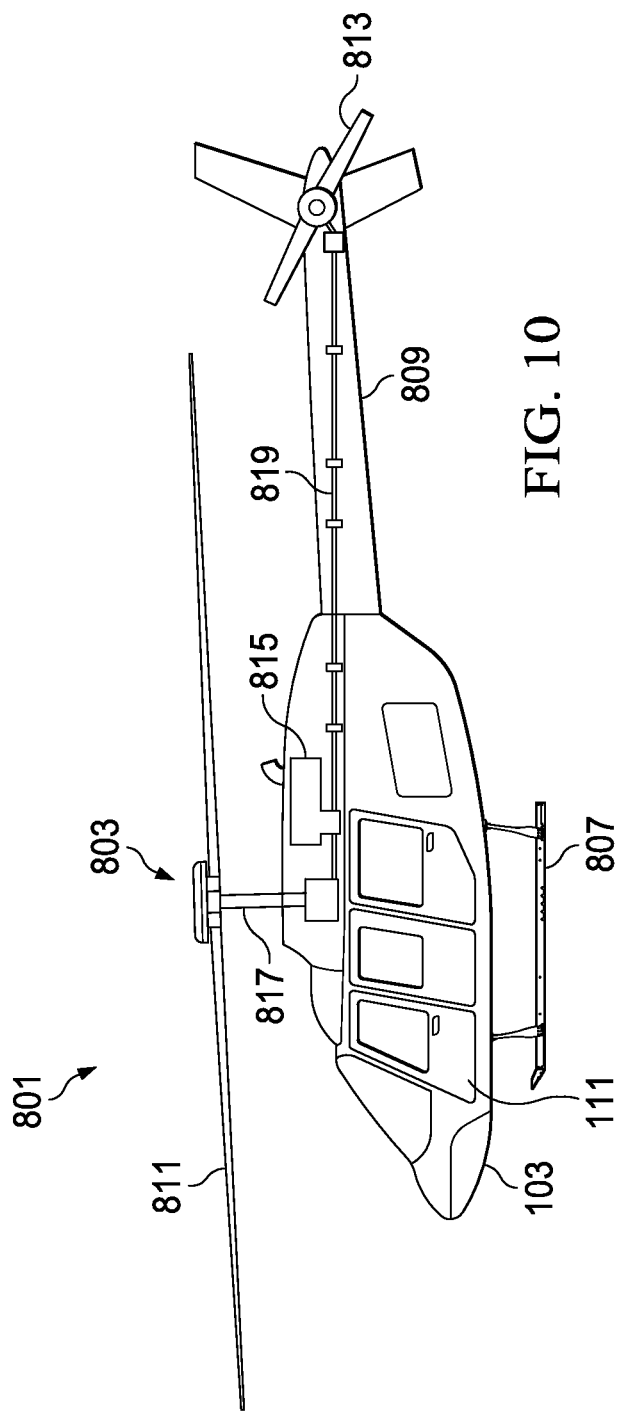
FIG. 10 is a side view of a rotorcraft having the jettisonable door system, according to an illustrative embodiment of the present disclosure.

Referring to FIGS. 1-10, a jettisonable door system 101 according to an example embodiment of the present disclosure is illustrated on a rotorcraft 801 (shown in FIG. 10). Referring in particular to FIG. 10 in the drawings, a rotorcraft 801 is illustrated. Rotorcraft 801 has a rotor system 803 with a plurality of main rotor blades 811. Rotorcraft 801 further includes an airframe 103, landing gear 807, a tail member 809, and tail rotor blades 813. An engine 815 supplies torque to a main rotor mast 817 and a tail rotor drive shaft 819, for the rotating of main rotor blades 811 and tail rotor blades 813, respectively. The pitch of each main rotor blade 811 can be selectively controlled in order to selectively control direction, thrust, and lift of rotorcraft 801. Further, the pitch of tail rotor blades 813 can be selectively controlled in order to selectively control yaw of rotorcraft 801.

It should be appreciated that rotorcraft 801 is merely exemplary of one type of aircraft for which jettisonable door system 101 can be implemented. For example, a conventional fixed wing aircraft is another example of an aircraft for which jettisonable door system 101 can be implemented. However, the implementation of jettisonable door system 101 is not limited to rotorcraft and fixed wing aircraft, as other aircraft types may also utilize jettisonable door system 101.

Referring primarily to FIGS. 1-9, jettisonable door system 101 includes an upper hinge assembly 107 and a lower hinge assembly 109, which both hingedly couple door 111 to airframe 103. Jettisonable door system 101 is functional with the regular door latch system. When a pilot seeks to make an emergency egress from a rotorcraft, such as rotorcraft 801, the pilot simply turns the emergency egress handle 105 with a rotational turn. In the illustrated embodiment, the amount of rotation is approximately ¼ of a full rotation (90 degrees); however, it should be appreciated that other degrees of rotation can be utilized. The rotational turn of emergency egress handle 105 causes door 111 to release from the portions of upper hinge assembly 107 and lower hinge assembly 109 that are fixedly coupled to airframe 103. Further, the rotational turn of emergency egress handle 105 simultaneously causes the actuation and release of the regular door latch system associated with a door handle 121.

Figure 1:
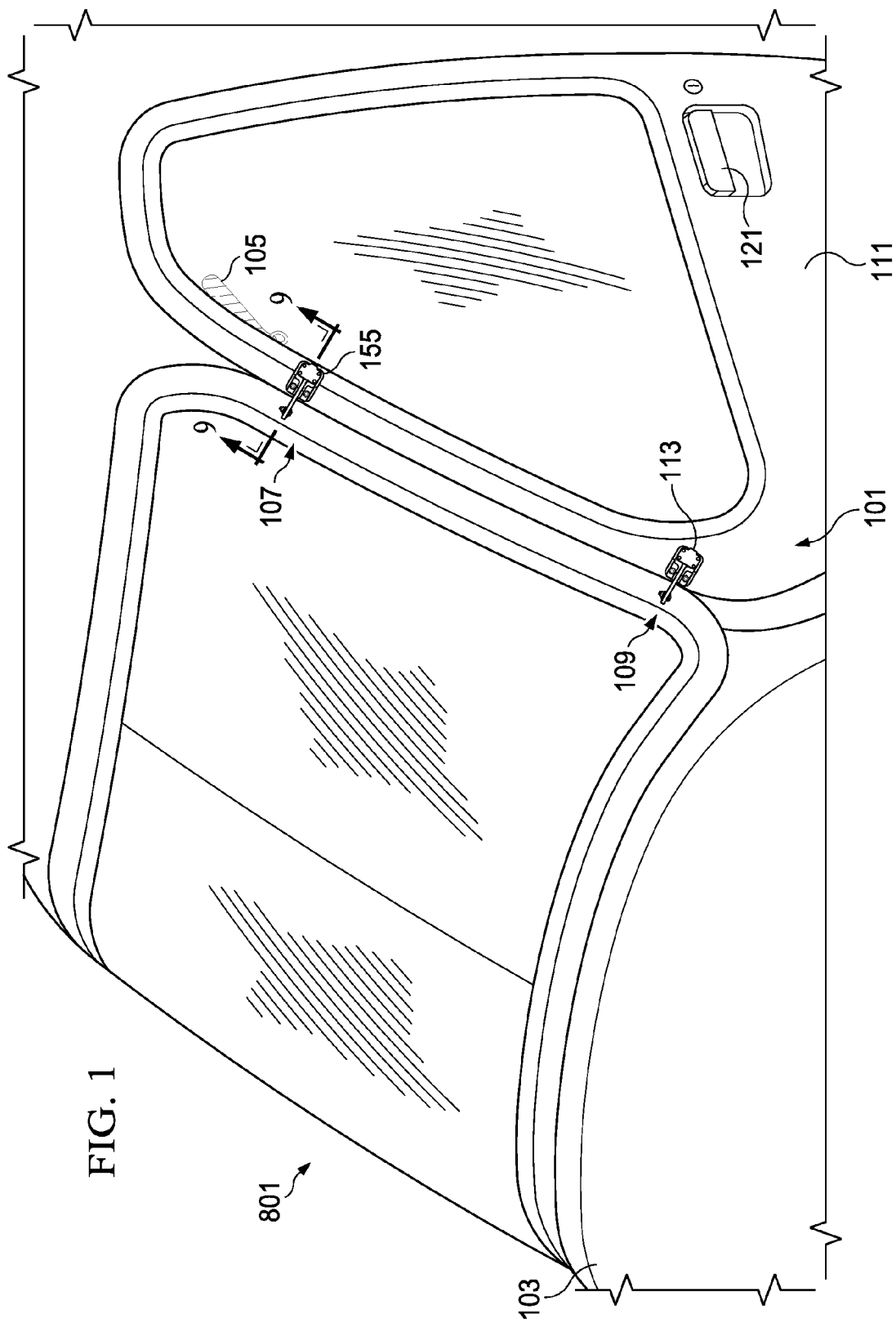
FIG. 1 is an exterior perspective view of a rotorcraft having a jettisonable door system, according to an illustrative embodiment of the present disclosure.
Figure 2:
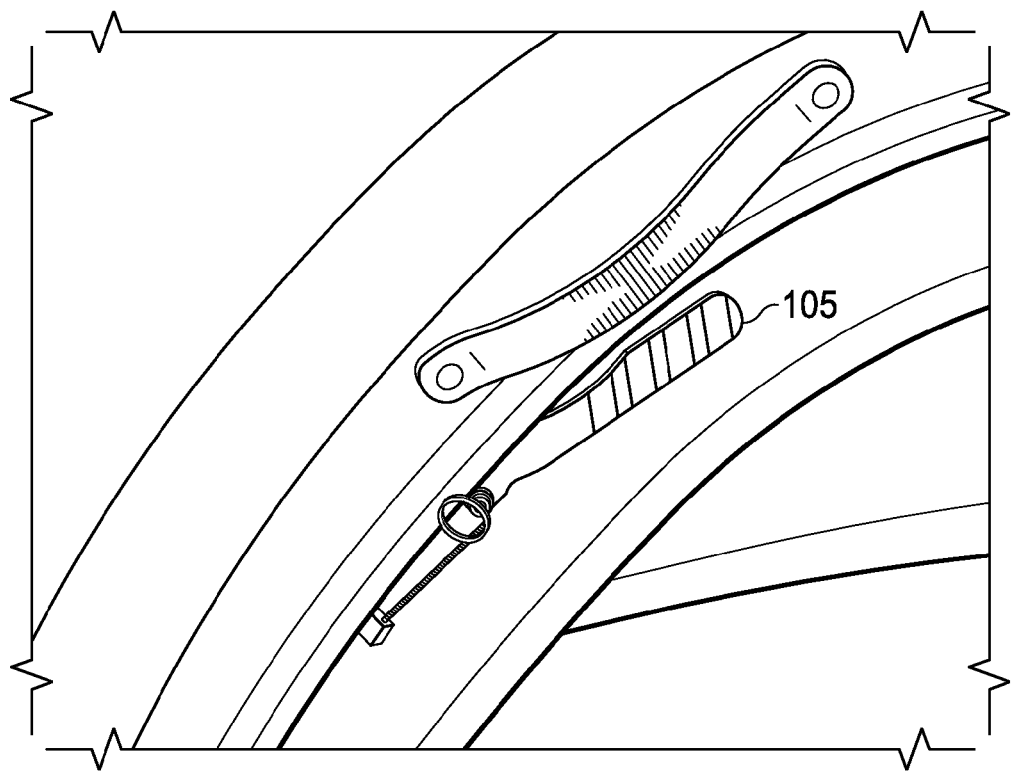
FIG. 2 is an interior perspective view of a rotorcraft having a jettisonable door system, according to an illustrative embodiment of the present disclosure.
Figure 3:
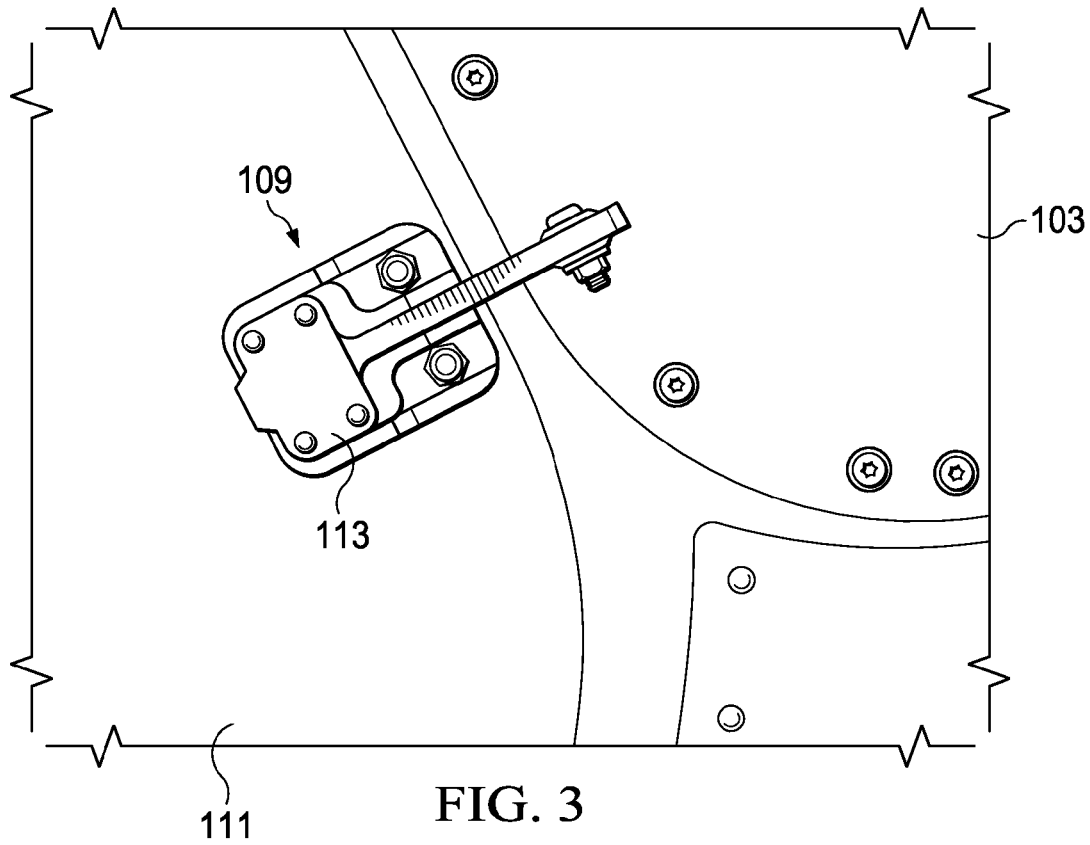
FIG. 3 is an exterior perspective view of a lower hinge assembly of the jettisonable door system, according to an illustrative embodiment of the present disclosure.
Figure 4B:
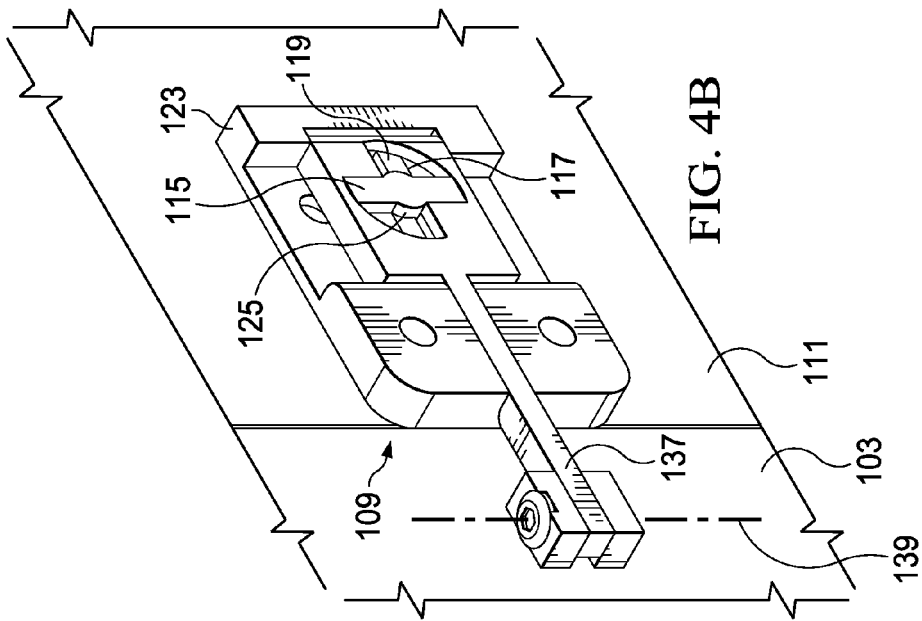
FIG. 4B is a partial exterior perspective view of the lower hinge assembly of the jettisonable door system, according to an illustrative embodiment of the present disclosure.
Figure 4A:
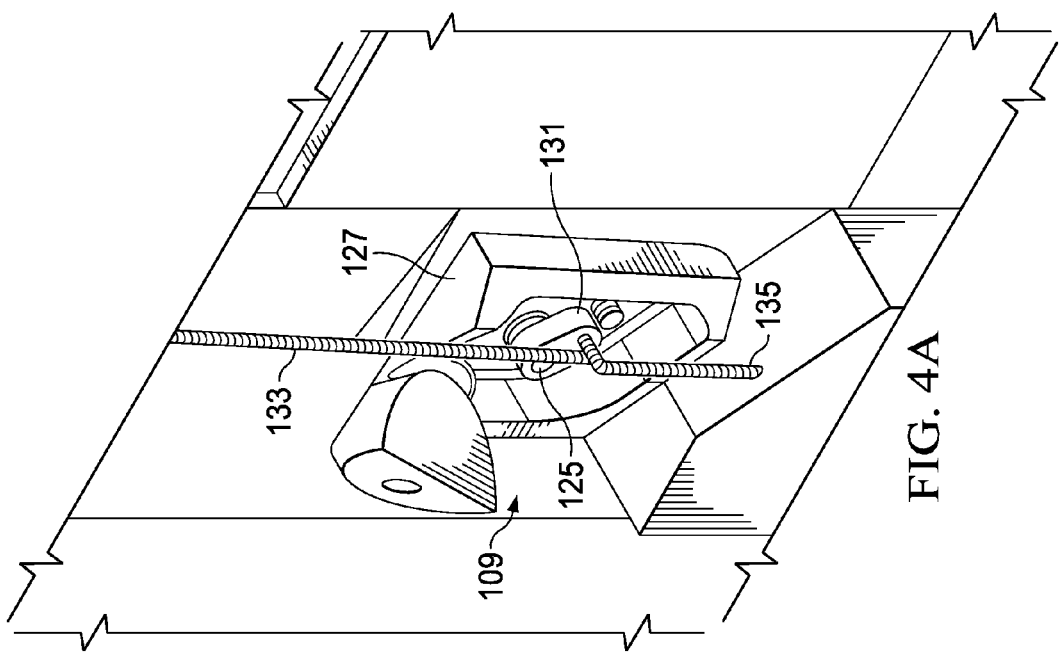
FIG. 4A is a partial interior perspective view of the lower hinge assembly of the jettisonable door system, according to an illustrative embodiment of the present disclosure.
Figure 5B:
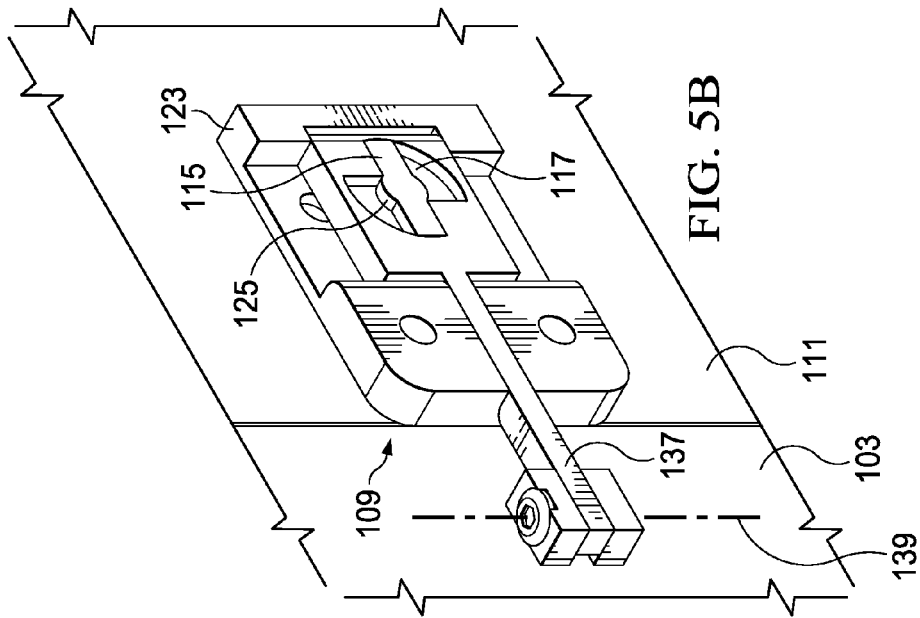
FIG. 5B is a partial exterior perspective view of the lower hinge assembly of the jettisonable door system, according to an illustrative embodiment of the present disclosure.
Figure 5A:
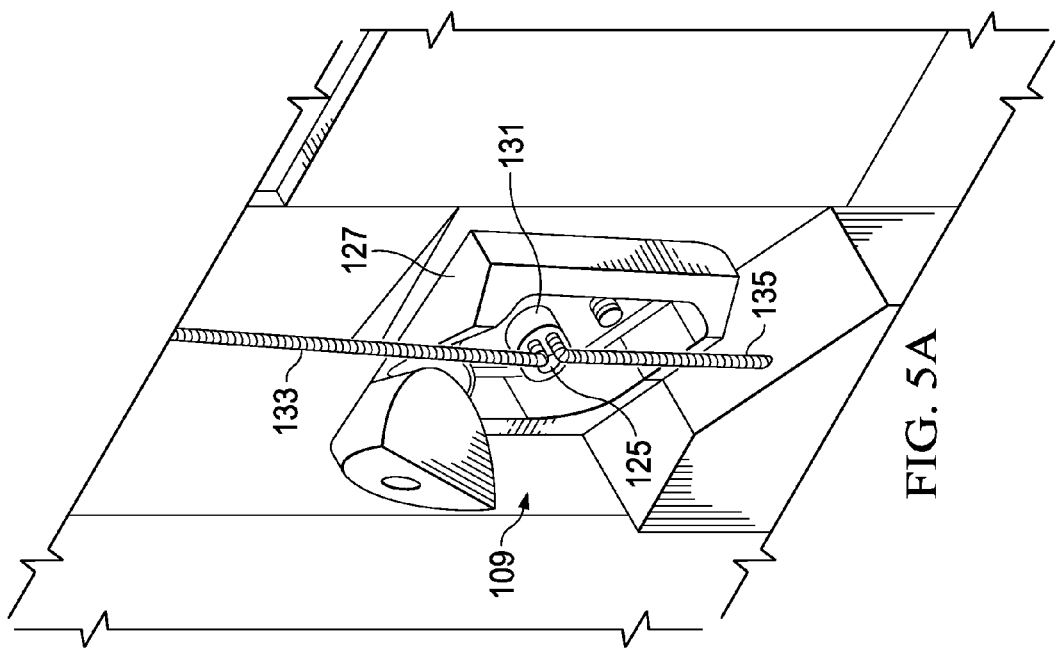
FIG. 5A is a partial interior perspective view of the lower hinge assembly of the jettisonable door system, according to an illustrative embodiment of the present disclosure.

Referring to FIGS. 4A, 4B, 5A, and 5B, lower hinge assembly 109 is illustrated in further detail. FIGS. 4A and 4B depict lower hinge assembly 109 in the locked position, while FIGS. 5A and 5B depict lower hinge assembly 109 in an unlocked position. FIGS. 4A and 5A are interior views of lower hinge assembly 109 with a portion of the door structure removed for clarity. FIGS. 4B and 5B are exterior views of lower hinge assembly 109 with cover 113 removed for clarity. Lower hinge assembly 109 can include an outboard plate 123 having an aperture for a pin 125 located therethrough. Outboard plate 123 is fixed to the structure of door 111. In the illustrated embodiment, outboard plate 123 is attached to an exterior surface of door 111. Lower hinge assembly 109 can include an inboard plate 127 having an aperture for pin 125 located therethrough. Inboard plate 127 is mounted in an interior portion of door 111. The outboard portion of pin 125 has a cam member 115 extending in an approximately rectangular shape, the outboard portion being approximately perpendicular to the axial centerline of pin 125. The inboard portion of pin 125 has an adapter 131 coupled thereto. The adapter 131 is configured for receiving a lower wire rope 135 that is operably coupled to the mechanism of door handle 121 for releasing the conventional door latch. As such, an actuation of emergency egress handle 105 also actuates the conventional door latch through a translation of lower wire rope 135. Adapter 131 is also configured for receiving an upper wire rope 133 that is operably coupled to emergency egress handle 105 such that an turning actuation of emergency egress handle 105 causes pin 125 to rotate. In the illustrated embodiment, adapter 131 is lobe shaped so that the attachment locations of lower wire rope 135 and upper wire rope 133 are offset from the rotational axis of pin 125.

A lower hinge 137 is hingedly coupled to airframe 103 at an axis 139 at a forward portion of lower hinge 137. During normal operation, lower hinge 137 is secured to outboard plate 123 by the position of cam member 115 of pin 125. Lower hinge 137 includes a body portion having a recessed portion 117 that not only secures lower hinge 137 to outboard plate 123, but also provides a rotational guide for cam member 115 to rotate therewithin. It should be appreciated that in an alternative embodiment, recessed portion 117 is absent such that cam member 115 resides against an external surface of lower hinge 137; however, recessed portion 117 can be advantageous because of resulting aerodynamic efficiency of cover 113 (shown in FIG. 3) being flush with outboard plate 123. Lower hinge 137 also includes an aperture 119 that provides clearance for cam member 115. Aperture 119 has geometry similar to the geometry of cam member 115, and also provides a clearance gap so that lower hinge 137 can separate from door 111 by traversal of cam member 115 through aperture 119 when pin 125 is rotated to cause geometric alignment of cam member 115 with aperture 119.

Figure 7B:
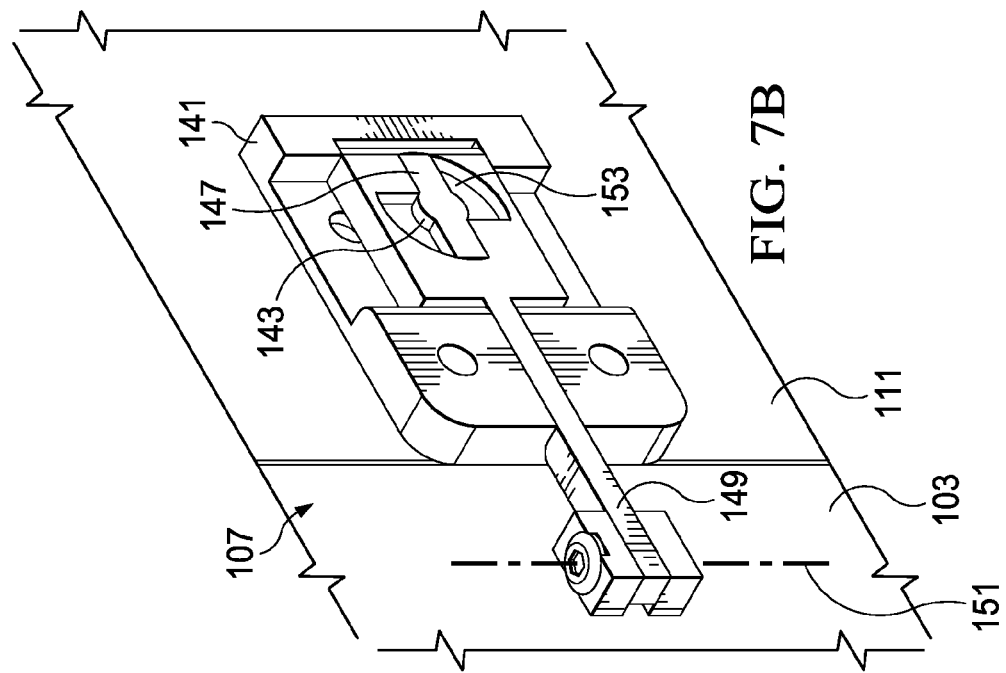
FIG. 7B is a partial exterior perspective view of the upper hinge assembly of the jettisonable door system, according to an illustrative embodiment of the present disclosure.
Figure 7A:
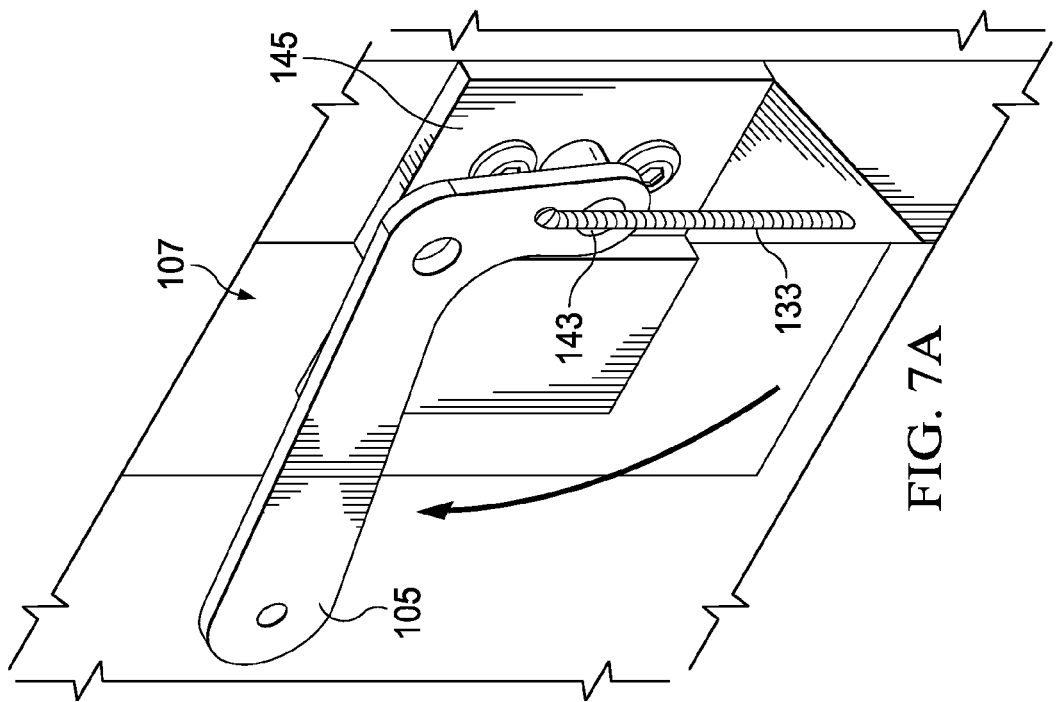
FIG. 7A is a partial interior perspective view of the upper hinge assembly of the jettisonable door system, according to an illustrative embodiment of the present disclosure.

Referring now to FIGS. 6A, 6B, 7A, 7B, and 9, upper hinge assembly 107 is illustrated in further detail. FIGS. 6A and 6B depict upper hinge assembly 107 in the locked position, while FIGS. 7A and 7B depict upper hinge assembly 107 in an unlocked position. FIGS. 6A and 7A are interior views of upper hinge assembly 107 with a portion of the door structure removed for clarity. FIGS. 6B and 7B are exterior views of upper hinge assembly 107 with cover 113 removed for clarity. Upper hinge assembly 107 can include an outboard plate 141 having an aperture for a pin 143 located therethrough. Outboard plate 141 is fixed to the structure of door 111. In the illustrated embodiment, outboard plate 141 is attached to an exterior surface of door 111. Upper hinge assembly 107 can include an inboard bracket 145 having an aperture for pin 143 located therethrough. Inboard bracket 145 is mounted in an interior portion of door 111. The outboard portion of pin 143 has a cam member 147 extending in an approximately rectangular shape, the outboard portion being approximately perpendicular to the axial centerline of pin 143. The inboard portion of pin 143 is coupled to handle 105, with handle 105 being exposed to the interior of the cabin of the aircraft. The handle 105 is configured for receiving an upper portion of upper wire rope 133. The upper wire rope 133 is also operably coupled to adapter 131 such that an actuation of handle 105 not only rotates pin 143 of upper hinge assembly 107, but also pin 125 of lower hinge assembly 109. In the illustrated embodiment, upper wire rope 133 is coupled to a portion of handle 105 that is offset from the rotational axis of pin 143.

An upper hinge 149 is hingedly coupled to airframe 103 at an axis 151 at a forward portion upper hinge 149. During normal operation, upper hinge 149 is secured to outboard plate 141 by the position of cam member 147 of pin 143. Upper hinge 149 includes a body portion having a recessed portion 153 that not only secures upper hinge 149 to outboard plate 141, but also provides a rotational guide for cam member 147 to rotate therewithin. It should be appreciated that in an alternative embodiment, recessed portion 153 is absent such that cam member 147 resides against an external surface of upper hinge 149; however, recessed portion 153 can be advantageous because of resulting aerodynamic efficiency of cover 155 (shown in FIG. 1) being flush with outboard plate 141. Upper hinge 149 also includes an aperture 157 that provides clearance for cam member 147. Aperture 157 has geometry similar to the geometry of cam member 147, and also provides a clearance gap so that upper hinge 149 can separate from door 111 by traversal of cam member 147 through aperture 157 when pin 143 is rotated to cause geometric alignment of cam member 147 with aperture 157.

Figure 8:
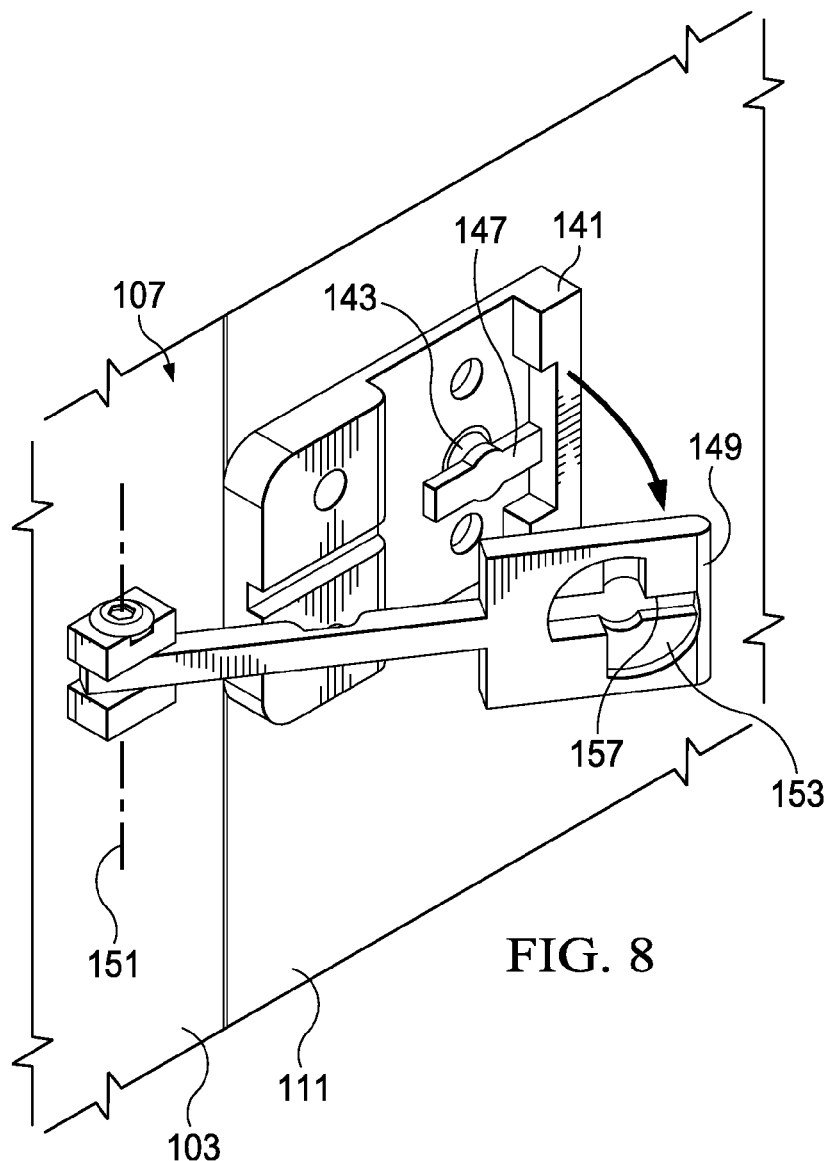
FIG. 8 is a partial exterior perspective view of the upper hinge assembly of the jettisonable door system, according to an illustrative embodiment of the present disclosure.
Figure 9:
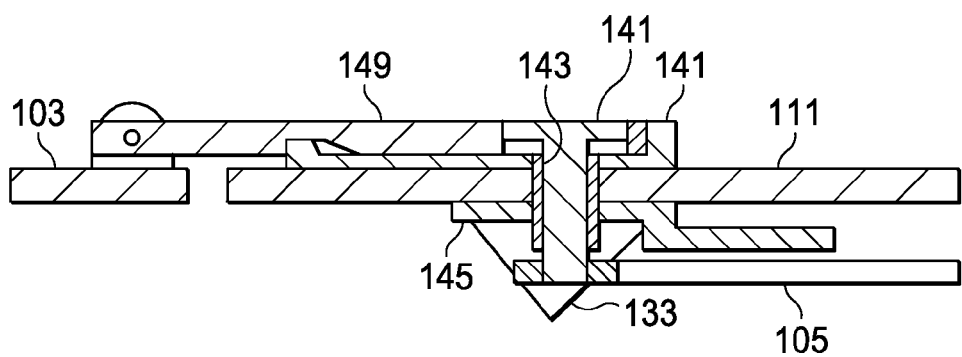
FIG. 9 is a cross-sectional view the upper hinge assembly of the jettisonable door system, take from cross-sectional lines 9-9 in FIG. 1, according to an illustrative embodiment of the present disclosure.

Referring now also to FIG. 8, a dynamic illustration of the release of door 111 from the aircraft at upper hinge assembly 107 is depicted. It should be appreciated that the release of door 111 from the aircraft at lower hinge assembly 109 is substantially similar. During operation of jettisonable door system 101 in an emergency egress situation, an actuation of handle 105 causes pins 125 and 143 to rotate, thereby causing cam members 115 and 147 to align with apertures 119 and 157, respectively. Further, because handle 105 is operably associated with the regular door latch system of handle 121, the rotational turn of emergency egress handle 105 simultaneously causes the actuation and release of the regular door latch system. As such, when handle 105 is rotatably actuated, the pilot can then push on the door 111 so that cam members 115 and 147 are translated through apertures 119 and 157, respectively, as the outward translation of door 111 pushes against upper hinge 149 and lower hinge 137, thereby causing each hinge to rotates about axes 151 and 139, respectively, until each hinge 149 and 137 are clear from the outward movement of door 111. When door 111 is removed from the aircraft, the pilot or other aircraft occupant is free to egress the aircraft without the impediment of door 111.

Jettisonable door system 101 provides significant advantages of conventional systems. For example, the release mechanisms in jettisonable door system 101 are much simpler in operation over conventional systems, and provide more reliability with less adjustment and maintenance. Further, the release mechanisms in jettisonable door system 101 are much smaller than conventional systems, which allow it to be more concealed and made much more aesthetically pleasing. Further, the quarter turn mechanism in its simplicity allows the pins to be constructed in such a manner as to handle the aerodynamic and other loads on the door without large, obtrusive structural elements. Further, the cam action of the mechanism allows it to be very solid without potential for wear, as it is as strong as the original door. Further, the jettisonable door system 101 is easily retrofitable onto an existing aircraft.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A jettisonable door system for an aircraft, the jettisonable door system comprising:
   a door;
   an upper hinge having a forward portion that is hingedly coupled to an airframe of the aircraft, the upper hinge having an aft portion that is releasably secured to an upper outboard plate of the door with an upper pin;
   a lower hinge having a forward portion that is hingedly coupled to the airframe of the aircraft, the lower hinge having an aft portion that is releasably secured to a lower outboard plate of the door with a lower pin, the lower pin having a lobe member that forms an oblong extension from an axis of rotation of the lower pin; and
   a handle operably associated with the upper pin, such that a rotation of the handle causes the upper pin to rotate;
   an upper wire having a length extending between a first end portion and a second end portion, the first end portion coupled to the handle at an upper point offset from a handle axis of rotation, the second end portion being coupled to the lobe member at a lower point offset from the axis of rotation of the lower pin, such that a rotation of the handle translates the upper wire and rotates the lobe member about the axis of rotation of the lower pin, thus simultaneously causing both the upper hinge and the lower hinge to release from the door.

2. The jettisonable door system according to claim 1, further comprising:
   a lower wire operably associated with the lower pin and a door latch, such that a rotation of the lower pin causes an actuation of the door latch.

3. The jettisonable door system according to claim 1, the upper pin further comprising:
   a cam member on the outboard portion of the upper pin, the cam member configured to securely engage the aft portion of the upper hinge when the upper pin is in a locked position.

4. The jettisonable door system according to claim 1, the lower pin further comprising:
   a cam member on the outboard portion of the lower pin, the cam member configured to securely engage the aft portion of the lower hinge when the lower pin is in a locked position.

5. The jettisonable door system according to claim 1, wherein the outboard portion of the upper hinge has a recessed portion that provides a rotational guide for a cam member of the upper pin.

6. The jettisonable door system according to claim 1, wherein the outboard portion of the upper hinge has an aperture that is configured to allow a cam member of the upper pin to translate therethrough when the upper pin is rotated to an unlocked position.

7. The jettisonable door system according to claim 6, wherein the aperture of the upper hinge and the cam member of the upper pin are rotationally offset by approximately 90 degrees when the jettisonable door system is in a locked position.

8. The jettisonable door system according to claim 6, wherein the aperture of the upper hinge and the cam member of the upper pin are aligned when the jettisonable door system is in an unlocked position.

9. The jettisonable door system according to claim 1, wherein the outboard portion of the lower hinge has a recessed portion that provides a rotational guide for a cam member of the lower pin.

10. The jettisonable door system according to claim 1, wherein the outboard portion of the lower hinge has an aperture that is configured to allow a cam member of the lower pin to translate therethrough when the lower pin is rotated to an unlocked position.

11. The jettisonable door system according to claim 10, wherein the aperture of the lower hinge and the cam member of the lower pin are rotationally offset by approximately 90 degrees when the jettisonable door system is in a locked position.

12. The jettisonable door system according to claim 10, wherein the aperture of the lower hinge and the cam member of the upper pin are aligned when the jettisonable door system is in an unlocked position.

13. The jettisonable door system according to claim 1, wherein the forward portion of the upper hinge and the forward portion of the lower hinge have a common axis of rotation.

14. The jettisonable door system according to claim 1, wherein the aircraft is a rotorcraft.

15. The jettisonable door system according to claim 1, wherein the aircraft is a fixed-wing airplane.

16. The jettisonable door system according to claim 1, further comprising:
  wherein the upper outboard plate and the lower outboard plate are secured to the door.

17. The jettisonable door system according to claim 1, further comprising:
  wherein the upper hinge and the lower hinge collectively function as the rotational hinges of the door.

* * * * *